No. 854,467. PATENTED MAY 21, 1907.
C. W. COTTRELL.
COMBINED MEASURING, WINDING, AND WEIGHING MACHINE.
APPLICATION FILED MAY 12, 1906.
2 SHEETS—SHEET 1.
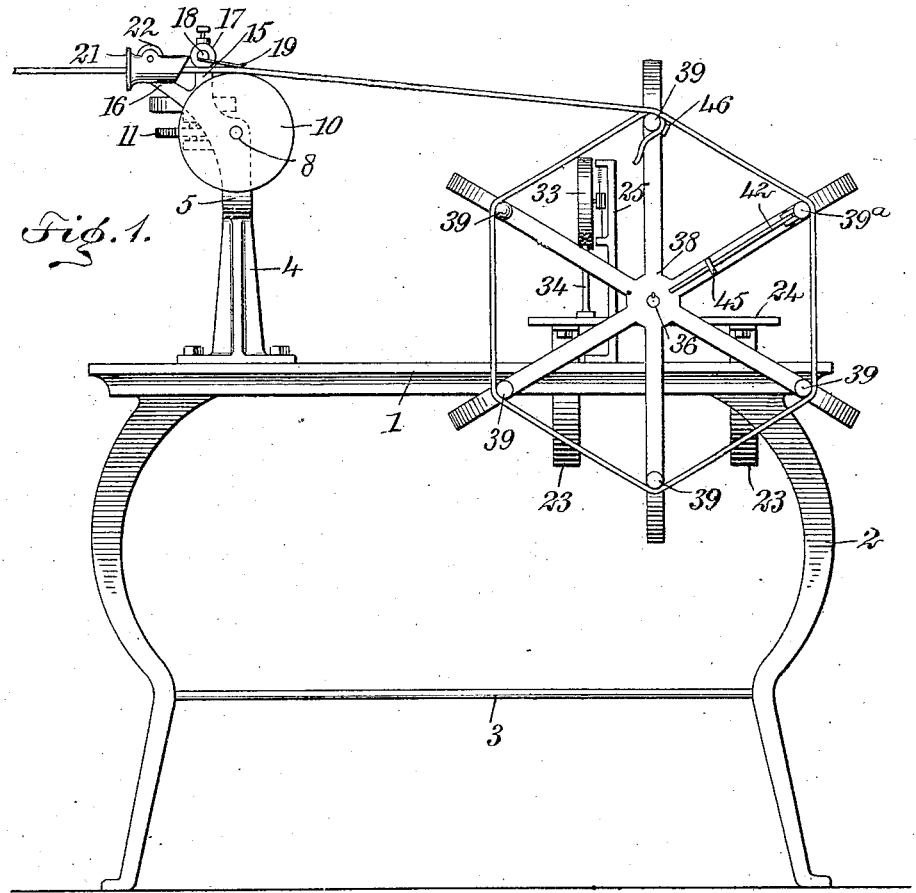
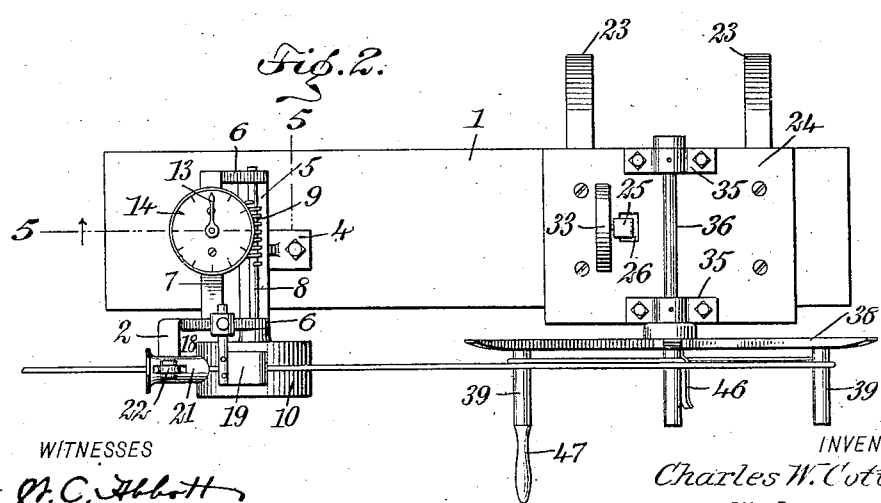
WITNESSES
INVENTOR
Charles W. Cottrell
BY Munn & Co
ATTORNEYS
THE NORRIS PETERS CO., WASHINGTON, D. C.

No. 854,467. PATENTED MAY 21, 1907.
C. W. COTTRELL.
COMBINED MEASURING, WINDING, AND WEIGHING MACHINE.
APPLICATION FILED MAY 12, 1906.
2 SHEETS—SHEET 2.
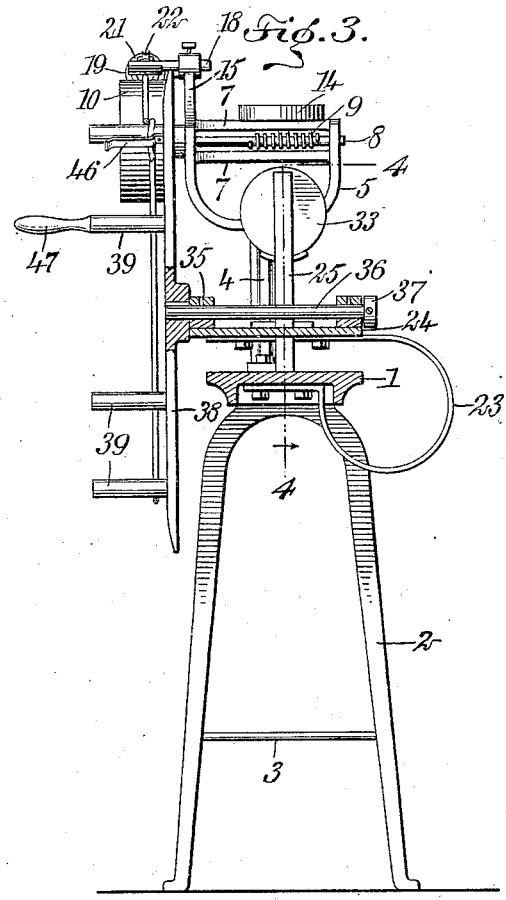
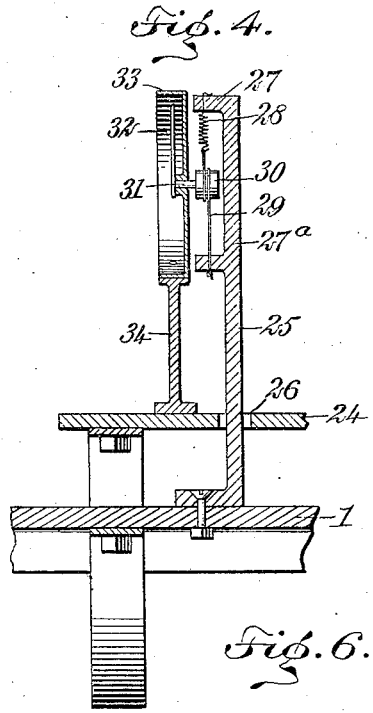
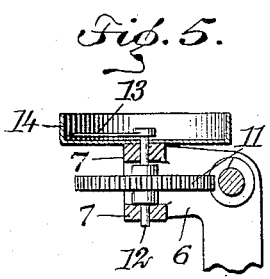
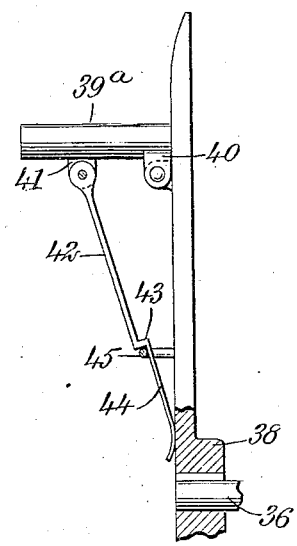
WITNESSES
INVENTOR
Charles W. Cottrell
BY
ATTORNEYS

UNITED STATES PATENT OFFICE.

CHARLES W. COTTRELL, OF WASHOUGAL, WASHINGTON.

COMBINED MEASURING, WINDING, AND WEIGHING MACHINE.

No. 854,467.　　　　Specification of Letters Patent.　　　Patented May 21, 1907.

Application filed May 12, 1906. Serial No. 316,513.

*To all whom it may concern:*

Be it known that I, CHARLES W. COTTRELL, a citizen of the United States, and a resident of Washougal, in the county of Clarke and State of Washington, have invented a new and Improved Combined Measuring, Winding, and Weighing Machine, of which the following is a full, clear, and exact description.

This invention is an improved combined machine for measuring, winding and weighing rope, wire cable and like material, to be used by store-keepers in the sale of such goods, thereby lessening the labor entailed when these operations are performed in the usual manner.

Among the objects of the invention is to combine in a single machine co-operative mechanism to perform the above functions in a single operation and in a speedy and accurate manner, and also provide a novel means by which, after the material is wound, it may be easily stripped from the winding means. I accomplish this by the hereinafter described structure, consisting of guiding means through which the material is passed, means for transmitting the movement of the material to a measuring means which indicates its length, and means about which the material is wound, which is so connected to a weighing means that from the latter may be readily determined the weight of the material as it passes about the winder.

Reference is to be had to the accompanying drawings forming a part of this specification, in which similar characters of reference indicate corresponding parts in all the figures.

Figure 1 is a front, side elevation of the machine complete, with material in place to be measured, wound and weighed; Fig. 2 is a plan view of Fig. 1; Fig. 3 is a transverse, vertical section through the reel spindle; Fig. 4 is a fragmentary view on the line 4—4 of Fig. 3; Fig. 5 is a section through the measuring dial on the line 5—5 of Fig. 2, and Fig. 6 is a view of one spoke of the reel to more clearly disclose the means for permitting the removal of the windings therefrom.

Referring to the drawings, 1 indicates the bed of the machine, suitably supported on legs 2 braced at some convenient point intermediate their length by rods 3 connecting the legs at each side and end of the machine. Bolted or otherwise secured in one end of the machine bed is a standard 4 terminating at its upper end in a yoke 5 having upwardly projecting arms with offset ends 6, said ends being connected together by horizontal bars 7, as best shown in Fig. 5.

Directly over the standard 4 is journaled in the arms of the yoke 5 a shaft 8, having fixed to it between the yoke arms a worm 9, and to its outer end at the front side of the machine a wheel 10 provided with a rubber periphery in order to engage a rope or the like with greater friction as it passes over it. The worm 9 meshes with a gear 11 journaled between the bars 7 on a spindle 12 with reduced ends passing through the bars, the upper end of which carries a pointer 13 traversing a dial 14 graduated in feet and fractional parts thereof, and secured to the top face of the upper bar 7.

The arm of the yoke 5 at the front side of the machine is extended above the shaft 8 toward the left, where it is expanded into a fork comprising branches 15 and 16. The branch 15 is formed with an eye 17 at its upper end, in which is adjustably secured a rod 18 carrying at its forward end a spring plate 19 contacting with the rubber periphery of the wheel 10, and adapted to hold the rope or other material which is to be wound, frictionally engaged therewith. The branch 16 of the fork is bent at right angles at 20, as shown in Fig. 2, and has fixed to it in alinement with the spring plate 19 a guide tube 21. This guide tube is provided with a grooved roller 22 journaled in a slot in its upper face to engage and guide the material to be wound between the wheel and spring plate.

Near the opposite end of the bed 1 of the machine from the standard 4, two flat springs 23 are secured to the bottom thereof and curved laterally at one side of the machine, said springs being secured at their opposite ends to the under face of a table 24, which table is normally positioned a slight distance above the bed and guided in a vertical path by a standard 25 secured to the bed and passing through a hole 26 in the table. At the upper end of the standard 25 are lugs 27 and 27ª projecting at right angles from one of its faces, and spaced apart a suitable distance to hold, respectively, one end of a spiral spring 28 and one end of a cord 29. The free ends of the spring and cord are connected together after the latter has been wound about a pulley 30. This pulley 30 is fixed to a spindle 31, carrying at its outer end a pointer 32, and journaled in the center of a dial 33 graduated in pounds and fractional parts thereof, said dial being supported on a standard 34 fixed to the table 24 adjacent to the standard 25.

Journaled in the transverse center of the table 24 in bearings 35 is a shaft 36, held from longitudinal movement in its bearing by a collar 37 fixed at its rear end, and a reel 38 keyed to it at the front side of the machine. The reel, as shown, comprises six radiating arms equally spaced apart and provided on their front faces with projecting studs or pins 39 fixed at an equal distance from the reel center. One of these pins 39$^a$, shown in detail in Fig. 6, is hingedly mounted on a lug carried by one of the spokes or radiating arms of the reel, by ears 40, which permit the pin to drop toward the reel center when not supported. For supporting the pin 39$^a$ are ears 41 at its outer end, between which is pivoted a rod 42 having an offset portion 43 connected with a spring end 44. The offset 43 is designed to engage a staple 45 projecting from this radiating arm of the reel when the pivotal pin is locked in elevated position. Another of the pins or studs 39 has fixed to it at one side a clamping spring 46 under which the material to be wound is secured at the beginning of the winding action. A still further change in one of the pins 39 is made by extending it to provide a handle 47 by which the reel is to be rotated.

In the operation of the machine, the rope or like material to be wound about the reel is passed through the guide tube 21 over the wheel 10 between the spring plate 19, which latter is adjusted by the set screw to press it to the wheel, and the material secured at its free end between the spring 46 and the pin 39, as represented in Fig. 1. The pointers 13 and 32 should then be at the zero mark. By now rotating the wheel by the handle 47, the material will be wound about the pins 39, which is continued until the pointer 13 points to the length of material desired. The weight of the material on the reel is transmitted to the table 24, and springs 23, depressing them as also the dial 33, thereby causing the pointer 32 to be rotated through the action of the pulley 30 and the cord wound about it. The weight of the material wound about the reel, therefore, is indicated by referring to the pointer 32. The windings of the material which are tightly pulled about the pins 39, due to the tension caused by the spring plate 19, are removed from the reel by releasing the shoulder 43 of the rod 42 from the staple 45, allowing the hinged pin 39$^a$ to drop to the reel center. This gives sufficient slack to the windings of the material to permit its ready removal from the reel.

The precise construction hereinbefore described is not material provided the essential characteristics are employed as pointed out in the annexed claims.

Having thus described my invention I claim as new and desire to secure by Letters Patent:

1. In a machine, in combination, a wheel, an adjustable spring plate adapted to engage a rope or like material as it is passed over the wheel, a shaft to which the wheel is fixed, a worm on the shaft, a worm wheel with which the worm is meshed, and a pointer adapted to be revolved over the face of a dial for indicating the length of material passed over the wheel.

2. In a machine, in combination, a machine bed, a standard mounted thereon, a yoke carried at the upper end of the standard, a shaft journaled in the yoke, a worm on the shaft, a wheel fixed to the outer end of the shaft at one side of the yoke, a spring plate adjustably carried by the yoke to press a rope or like material to the wheel, a worm wheel in mesh with the worm, and a pointer adapted to be turned by the worm wheel over a dial for indicating the length of material passed between the wheel and spring plate.

3. In a machine, in combination, a wheel, a spring plate coacting therewith to engage a rope or the like as it is passed over the wheel, means operable by the wheel for indicating the length of the rope passed thereover, and a guide tube having a grooved roller journaled therein for directing the rope between the wheel and spring plate.

4. In a machine, in combination, a wheel having a rubber periphery, an adjustable spring plate adapted to engage a rope or the like as it is passed over the wheel, means operable by the wheel for indicating the length of the rope passed thereover, and a guide tube having a roller journaled therein for directing the rope between the wheel and spring plate.

5. In a machine, in combination, a support, a shaft journaled in the support having a wheel fixed thereto, a spring plate adapted to engage a rope or the like as it is passed over the wheel, a worm fixed to the shaft and meshing with a worm wheel operating a pointer to indicate the length of the rope passed over the wheel, and guiding means for directing the rope between the wheel and spring plate.

In testimony whereof I have signed my name to this specification in the presence of two subscribing witnesses.

CHARLES W. COTTRELL.

Witnesses:
  D. W. HUTCHINSON,
  C. M. KEEP.